US012476642B2

(12) United States Patent
Kashyap et al.

(10) Patent No.: US 12,476,642 B2
(45) Date of Patent: Nov. 18, 2025

(54) DELAY LINE CALIBRATION BASED ON DERIVED REFERENCE SIGNALS

(71) Applicant: NVIDIA Corporation, Santa Clara, CA (US)

(72) Inventors: Abhijith Kashyap, Sunnyvale, CA (US); Virendra Kumar, Mountain View, CA (US); Bobak Modaress-Razavi, Apex, NC (US); Hao-Yi Wei, Fremont, CA (US); Vipul Katyal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 37 days.

(21) Appl. No.: 18/602,754

(22) Filed: Mar. 12, 2024

(65) Prior Publication Data

US 2025/0293692 A1    Sep. 18, 2025

(51) Int. Cl.
*H03L 7/081* (2006.01)
*G06F 1/08* (2006.01)
*G06F 1/12* (2006.01)
*H03K 5/14* (2014.01)

(52) U.S. Cl.
CPC ............. *H03L 7/0812* (2013.01); *G06F 1/08* (2013.01); *G06F 1/12* (2013.01); *H03K 5/14* (2013.01)

(58) Field of Classification Search
None
See application file for complete search history.

(56) References Cited

U.S. PATENT DOCUMENTS

| | | |
|---|---|---|
| 11,665,029 B2 | 5/2023 | Balan et al. |
| 11,757,615 B2 | 9/2023 | Hunag et al. |
| 11,936,379 B2 | 3/2024 | Chadha et al. |
| 2019/0187744 A1* | 6/2019 | Chang .................. G11C 7/1039 |
| 2022/0120804 A1 | 4/2022 | Khare et al. |
| 2023/0162780 A1 | 5/2023 | Chadha et al. |

* cited by examiner

*Primary Examiner* — Cassandra F Cox
(74) *Attorney, Agent, or Firm* — Iron Summit IP L.L.P.

(57) ABSTRACT

Techniques for improving the accuracy of delay line calibration schemes. For example, an amount of offset may be determined between one or more first portions of a first clock signal and one or more second portions of a second clock signal that is delayed relative to the first clock signal. The first portion(s) may correspond to the second portion(s) based at least on the second clock signal being delayed relative to the first clock signal. In some examples, a value may be determined based at least on the amount of offset. The value may correspond to an amount to adjust the first clock signal to reduce the amount of offset. In some examples, a delay line may then be calibrated, based at least on the second value, to adjust the first clock signal.

20 Claims, 9 Drawing Sheets

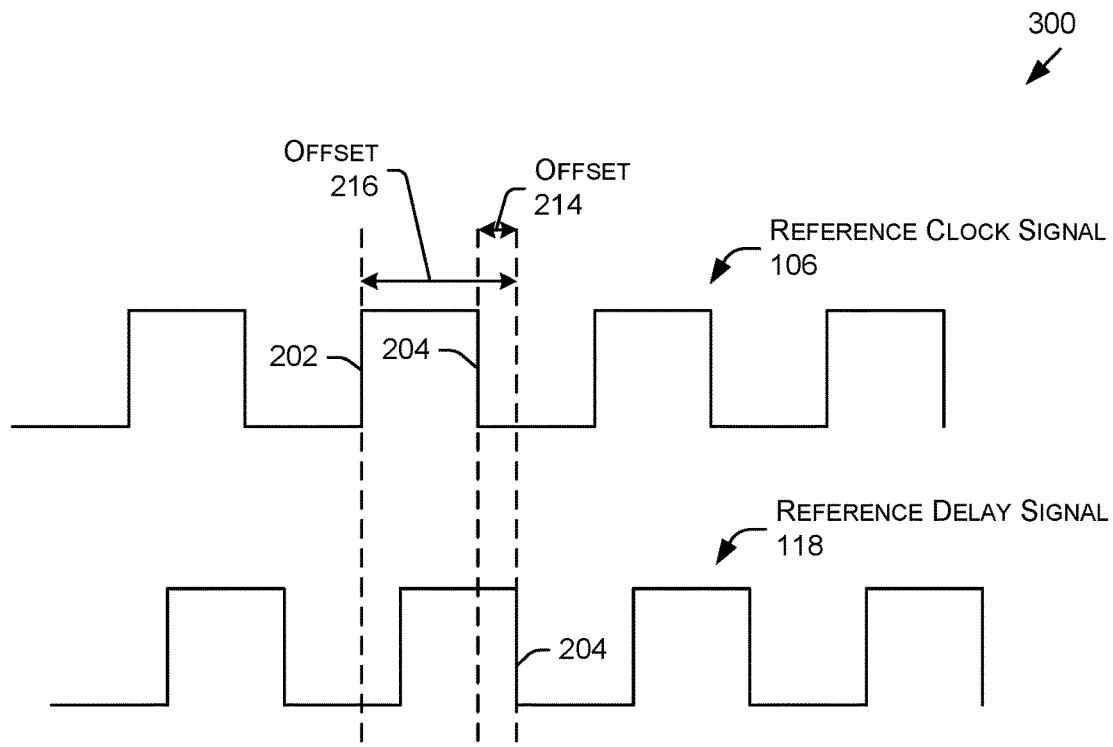
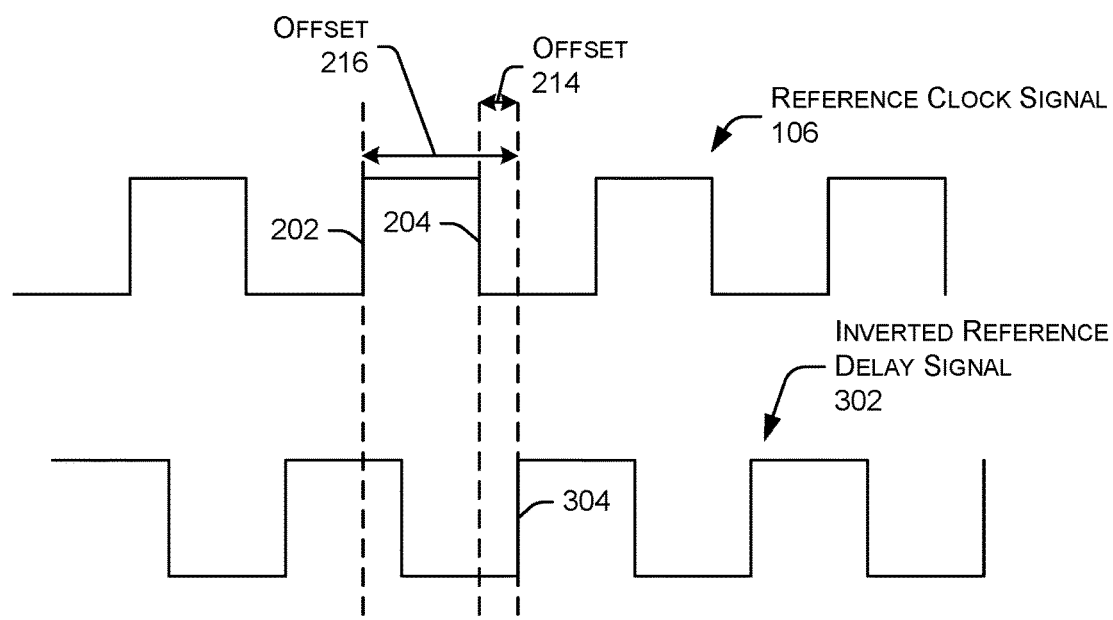
FIGURE 3

500

```
┌─────────────────────────────────────────────────┐
│ DETERMINE A FIRST VALUE CORRESPONDING TO A FIRST│
│ AMOUNT OF OFFSET BETWEEN ONE OR MORE PORTIONS OF A│
│ FIRST CLOCK SIGNAL AND ONE OR MORE CORRESPONDING │
│ PORTIONS OF A SECOND CLOCK SIGNAL THAT IS DELAYED│
│       RELATIVE TO THE FIRST CLOCK SIGNAL         │
│                      B502                        │
└─────────────────────────────────────────────────┘
                        │
                        ▼
┌─────────────────────────────────────────────────┐
│ DETERMINE A SECOND VALUE BASED AT LEAST ON THE FIRST│
│ VALUE, THE SECOND VALUE CORRESPONDING TO A SECOND│
│ AMOUNT TO ADJUST THE FIRST CLOCK SIGNAL TO REDUCE│
│            THE FIRST AMOUNT OF OFFSET            │
│                      B504                        │
└─────────────────────────────────────────────────┘
                        │
                        ▼
┌─────────────────────────────────────────────────┐
│  CAUSE A CALIBRATION OF A DELAY LINE, BASED AT LEAST ON│
│  THE SECOND VALUE, TO ADJUST THE FIRST CLOCK SIGNAL│
│                      B506                        │
└─────────────────────────────────────────────────┘
```

```
DETERMINE A FIRST VALUE CORRESPONDING TO A FIRST AMOUNT
OF OFFSET BETWEEN A FIRST PHASE OF A FIRST CLOCK SIGNAL
AND THE FIRST PHASE OF A SECOND CLOCK SIGNAL THAT IS
DELAYED RELATIVE TO THE FIRST CLOCK SIGNAL
B602
```

```
DETERMINE, BASED AT LEAST ON INVERTING AT LEAST ONE OF
THE FIRST CLOCK SIGNAL OR THE SECOND CLOCK SIGNAL, A
SECOND VALUE CORRESPONDING TO A SECOND AMOUNT OF
OFFSET BETWEEN A SECOND PHASE OF THE FIRST CLOCK SIGNAL
AND THE SECOND PHASE OF THE SECOND CLOCK SIGNAL
B604
```

```
DETERMINE A THIRD VALUE BASED AT LEAST ON THE FIRST
VALUE AND THE SECOND VALUE, THE THIRD VALUE
CORRESPONDING TO A THIRD AMOUNT TO ADJUST THE FIRST
CLOCK SIGNAL TO REDUCE THE FIRST AMOUNT OF OFFSET AND
THE SECOND AMOUNT OF OFFSET
B606
```

```
CAUSE A CALIBRATION OF A DELAY LINE, BASED AT LEAST ON THE
THIRD VALUE, TO ADJUST THE FIRST CLOCK SIGNAL
B608
```

DETERMINE A FIRST VALUE BASED AT LEAST ON A FIRST CALIBRATION BETWEEN A DELAY LINE SIGNAL AND A REFERENCE DELAY SIGNAL
B702

DETERMINE A SECOND VALUE BASED AT LEAST ON A SECOND CALIBRATION BETWEEN THE DELAY LINE SIGNAL AND THE REFERENCE DELAY SIGNAL
B704

DETERMINE A THIRD VALUE BASED AT LEAST ON A THIRD CALIBRATION BETWEEN AN INVERTED DELAY LINE SIGNAL AND AN INVERTED REFERENCE DELAY SIGNAL
B706

DETERMINE A FOURTH VALUE BASED AT LEAST ON A FOURTH CALIBRATION BETWEEN THE INVERTED DELAY LINE SIGNAL AND THE INVERTED REFERENCE DELAY SIGNAL
B708

DETERMINE A FIFTH VALUE BASED AT LEAST ON THE FIRST VALUE AND THE SECOND VALUE
B710

DETERMINE A SIXTH VALUE BASED AT LEAST ON THE THIRD VALUE AND THE FOURTH VALUE
B712

DETERMINE A SEVENTH VALUE BASED AT LEAST ON THE FIFTH VALUE AND THE SIXTH VALUE
B714

CALIBRATE A DELAY LINE BASED AT LEAST ON THE SEVENTH VALUE TO SYNCHRONIZE THE DELAY LINE SIGNAL WITH THE REFERENCE DELAY SIGNAL
B716

FIGURE 7

DELAY LINE CALIBRATION BASED ON DERIVED REFERENCE SIGNALS

BACKGROUND

Digital delay lines may be used in computing systems to delay a digital signal by a desired time interval. In contrast to other implementations (e.g., analog delay lines, phase interpolators, etc.), digital delay lines may provide an area-efficient and/or power-efficient way to delay the digital signal. Because of different operating environments, system constraints, and/or system designs, it may be necessary for digital delay lines to be regularly calibrated to adjust for variations in process, voltage, and/or temperature (PVT). That is, digital delay lines may need to be calibrated to provide a consistent delay despite PVT variations. In some instance, digital delay lines may be calibrated through the use of a digital delay line locked loop (DDLL), which may enable adjustment of delay in fractions of unit intervals across different PVT corners.

However, current delay line calibration systems and techniques, including DDLL-based approaches, may not take into account various potential sources of inaccuracy, thereby compromising the effectiveness of the calibration system and ultimately impacting the accuracy of a delay line signal. For instance, duty cycle distortion may introduce variations in the duty cycle of clock signals, thereby affecting the timing and/or accuracy of phase detection processes and/or leading to inaccuracies in delay line calibration locking. Additionally, even with meticulous layout design, PVT variations may introduce delays in different clock paths leading to mismatches between the reference clock and the delayed clock, resulting in inaccuracies in delay calibration. Furthermore, a phase detector within a delay line calibration circuit may be susceptible to errors, particularly in the presence of On-Chip Variation (OCV) and PVT variations, which may introduce biases in the phase detection process.

SUMMARY

Embodiments of the present disclosure relate to delay line calibration based on derived reference signals. Systems and methods are disclosed that, among other things, may improve the accuracy of delay line calibration techniques (e.g., DDLL) across multiple PVT corners and/or make the delay line calibration techniques tolerant to OCV.

In contrast to conventional systems, such as those described above, the current systems, in some embodiments, are able to account for various sources of DDLL inaccuracy by synchronizing the delay line signal (also referred to as a "delayed clock") to a delayed version of a reference clock and/or by inverting the reference clock and changing the edge of the reference clock to calibrate to. For instance, by incorporating a delay element on the reference clock as described herein, the disclosed system(s) may be able to intentionally skew the reference clock of the DDLL to account for mismatches between the reference clock and the delayed clock. In this way, the system(s) may be able to address the skew component of DDLL calibration errors caused by PVT variations and/or on-chip-variations that introduce different delays on different clock paths, even with careful layout. Additionally, by inverting the reference clock and being able to change the edge of the reference clock to calibrate the delayed clock to, systemic bias in the phase detector may be compensated for by accounting for both low to high (e.g., 0 to 1) transitions and high to low (e.g., 1 to 0) transitions of the phase detector. Additionally, with the reference clock inversion, averaging of high-phase and low-phase of the clock may be performed automatically. This may address duty cycle distortion and/or phase detector bias which can be problematic for DDLL systems. Consequently, the system(s) disclosed herein may promote accurate DDLL locking and may increase available margin in memory channels, thereby raising the achievable speed of high-speed memory interfaces and/or other devices.

BRIEF DESCRIPTION OF THE DRAWINGS

The present systems and methods for delay line calibration based on derived reference signals are described in detail below with reference to the attached drawing figures, wherein:

FIG. 3 is another timing diagram illustrating additional example detail associated with the various clock signals described herein, in accordance with some embodiments of the present disclosure;

FIG. 5 is a flow diagram illustrating an example method for calibrating a delay line based on a derived reference signal, in accordance with some embodiments of the present disclosure;

FIG. 6 is a flow diagram illustrating another example method for calibrating a delay line based on a derived reference signal, in accordance with some embodiments of the present disclosure;

FIG. 7 is a flow diagram illustrating yet another example method for calibrating a delay line based on a derived reference signal, in accordance with some embodiments of the present disclosure;

DETAILED DESCRIPTION

Figure 1:
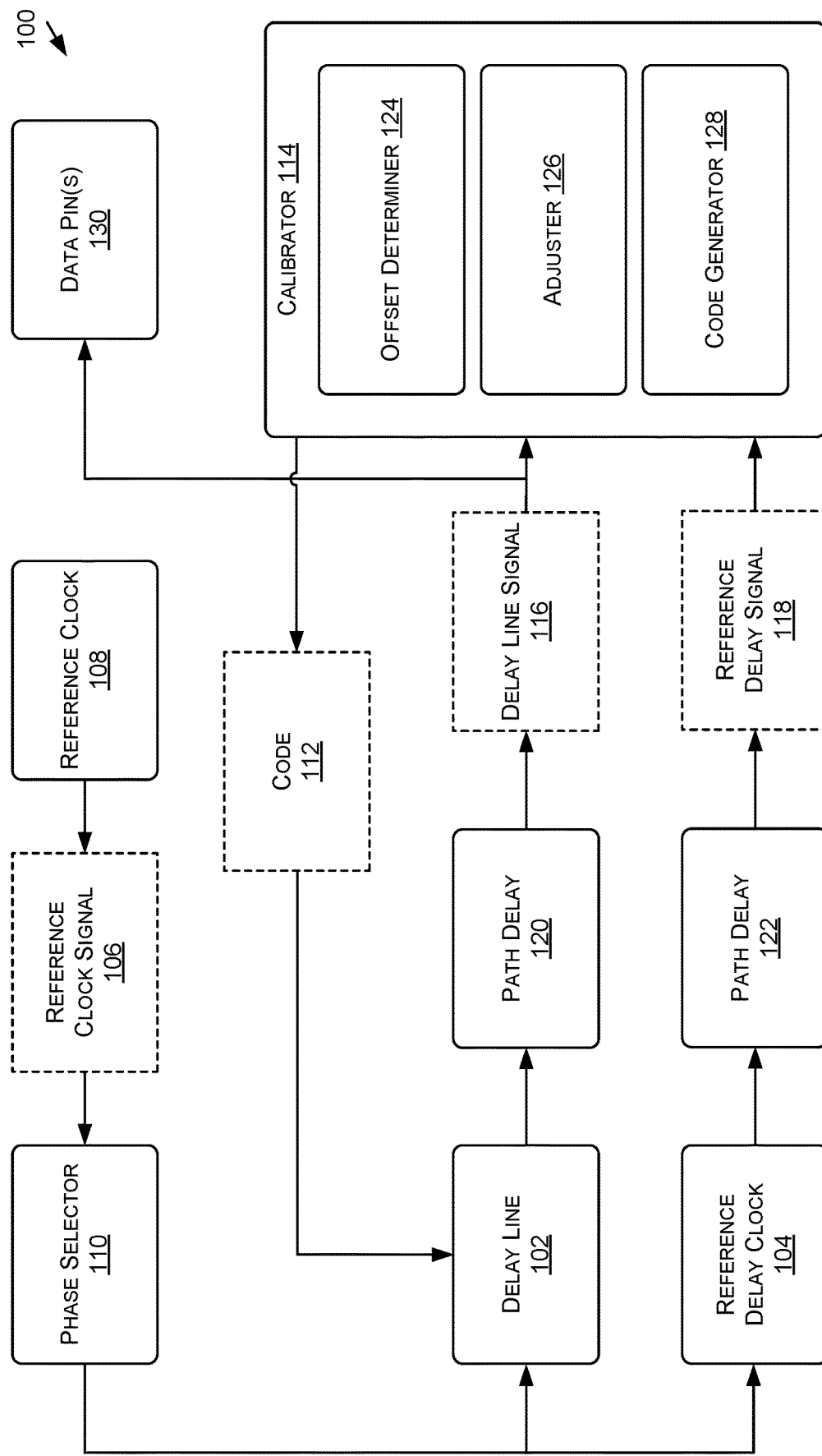
FIG. 1 is a data flow diagram illustrating an example process for calibrating a delay line based on a derived reference signal, in accordance with some embodiments of the present disclosure.

Systems and methods are disclosed related to delay line calibration based on derived reference signals. For instance, a system(s) may obtain a clock signal from a reference clock and generate one or more derived signals that may be used for calibrating a delay line (e.g., a digital delay line). In some examples, the derived signal(s) may include at least a delayed reference clock signal, which may be a delayed version of the original reference clock signal. The delayed reference clock signal may lag the original reference clock signal by a known magnitude. In some instances, the magnitude of the delay/lag may be in a range of 10% to 50% of the period of the original reference clock signal. For example, if the period of the reference clock signal is 100 milliseconds, a delay magnitude of 20% would mean a delay of 20 milliseconds. That is, the delayed reference clock signal would arrive 20 milliseconds later than the original reference clock signal.

Additionally, or alternatively, in some examples, the derived signal(s) may include at least an inverted reference clock signal, which may be an inverted version of the original reference clock signal. For instance, the system(s) may include an inverter (e.g., NOT gate) that inverts the reference clock signal. In some instances, the inverted reference clock signal may further be delayed with respect to the reference clock. For example, the inverter may invert the reference clock signal to generate the inverted reference clock signal, and then the inverted reference clock signal may be delayed relative to the reference clock and/or the inverted reference clock to generate an inverted and delayed reference clock.

In these ways described above, as well as in other ways described herein, a first clock signal (e.g., the reference clock) may be used to derive one or more second clock signals (e.g., delayed reference clock, inverted reference clock, inverted delayed reference clock, etc.) for calibrating a delay line in accordance with some embodiments of the present disclosure. For example, the first clock signal may be the reference clock or input clock to a delay line calibration circuit, which may correspond to a DDLL. The delay line calibration circuit may then derive the second clock signal from the first clock signal (e.g., by delaying, inverting, etc.) and use the second clock signal as a reference for calibrating the delay line. In examples, the delay line calibration circuit may also derive the delay line signal—also referred to herein as the "delayed clock signal" and/or the "delayed clock"—from the first clock signal by implementing a delay on the first clock signal. As such, prior to the delay line being calibrated or locked, the delayed clock signal may lead the delayed reference clock because the delayed clock signal may correspond to the first clock signal.

In some examples, the system(s) may implement the delay line signal, at least in part, by determining a number of delay buffers necessary to synchronize the first clock signal with the second clock signal. That is, the system(s) may determine a magnitude by which the second clock is delayed relative to the first clock, and this magnitude may be used to select the number of delay buffers such that the delay line output signal is synchronized with the second clock signal. For example, the system(s) may determine a first value corresponding to a first amount of offset (e.g., delay, shift, displacement, time, etc.) between a high phase of the first clock signal and a corresponding high phase of the second clock signal, which may be delayed relative to the first clock signal. Additionally, or alternatively, the system(s) may determine a second value corresponding to a second amount of offset between a low phase of the first clock signal and a corresponding low phase of the second clock signal. In examples, the system(s) may then determine a third value corresponding to a third amount to adjust the first clock signal to reduce the first amount of offset and/or the second amount of offset.

In some instances, the third value may represent or otherwise indicate the number of delay buffers to be used by the delay line to synchronize the delay line signal with the second clock signal. That is, the third value may represent the number of delay buffers necessary to shift or otherwise delay the first clock signal to synchronize it with the second clock signal. In some instances, the number of buffers used by the delay line may delay the first clock signal such that the output signal of the delay line lags the second clock signal by roughly 50% of the period of the second clock signal and/or in a way that edges of the two clock signals are aligned. For instance, one or more rising edges of the delay line signal may be synchronized or aligned with one or more falling edges of the delayed reference clock signal, and vice-versa.

In some examples, the values (e.g., the first value and the second value) corresponding to the amount(s) of offset between the phases of the first clock and the second clock may be determined by evaluating differences between locations corresponding to edges of the first clock and the second clock. For instance, in continuing the example from above, to determine the first value the system(s) may determine a fourth value corresponding to a fourth amount of offset between a rising edge of the first clock signal and a corresponding rising edge of the second clock signal. Additionally, or alternatively, the system(s) may determine a fifth value corresponding to a fifth amount of offset between a falling edge of the first clock signal and the corresponding rising edge of the second clock signal. In examples, the rising edge and the falling edge of the first clock signal may define a unit interval associated with the high phase of the first clock signal. In some examples, the system(s) may determine the first value based at least on calculating a difference between the fourth value and the fifth value. The difference may correspond with a unit interval delay code (e.g., number of delay buffers) to be used for the high phase of the delay line.

Similarly, and in continuing the example from above, to determine the second value corresponding to the second amount of offset between the low phase of the first clock signal and the corresponding low phase of the second clock signal, the system(s) may invert the first clock signal and/or the second clock signal and then perform a similar process to that described above for determining the first value. For instance, based at least on the first clock signal and/or the inverted second clock signal, the system(s) may determine a sixth value corresponding to a sixth amount of offset between a falling edge of the first clock signal and a corresponding rising edge of the inverted second clock signal. Additionally, in some examples, the system(s) may determine a seventh value corresponding to a seventh amount of offset between the rising edge of the first clock signal and the rising edge of the inverted second clock signal. In examples, the rising edge and the falling edge of the first clock signal may define a unit interval of the low phase of the second clock signal. In some examples, the system(s) may determine the second value based at least on calculating a difference between the sixth value and the seventh value. The difference may correspond with a unit interval delay code (e.g., number of delay buffers) to be used for the low phase of the delay line.

In some examples, the system(s) may perform the techniques disclosed herein continuously to track periodic delay variations and make adjustments to the delay line to compensate for changes in OCV and/or PVT. For instance, based at least on a change in at least one of process, voltage, and/or temperature, the system(s) may perform a second calibration of the delay line to re-adjust the first clock signal. That is, because of the change in the process, the voltage, and/or the temperature, the delay line signal may become unsynchronized with the second clock signal. However, because the system(s) may perform the delay line calibration techniques continuously (e.g., as a DDLL), the system(s) may automatically recalibrate the delay line signal to adjust for the PVT changes.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 is a data flow diagram illustrating an example process 100 for calibrating a delay line based on a derived reference signal, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 2:
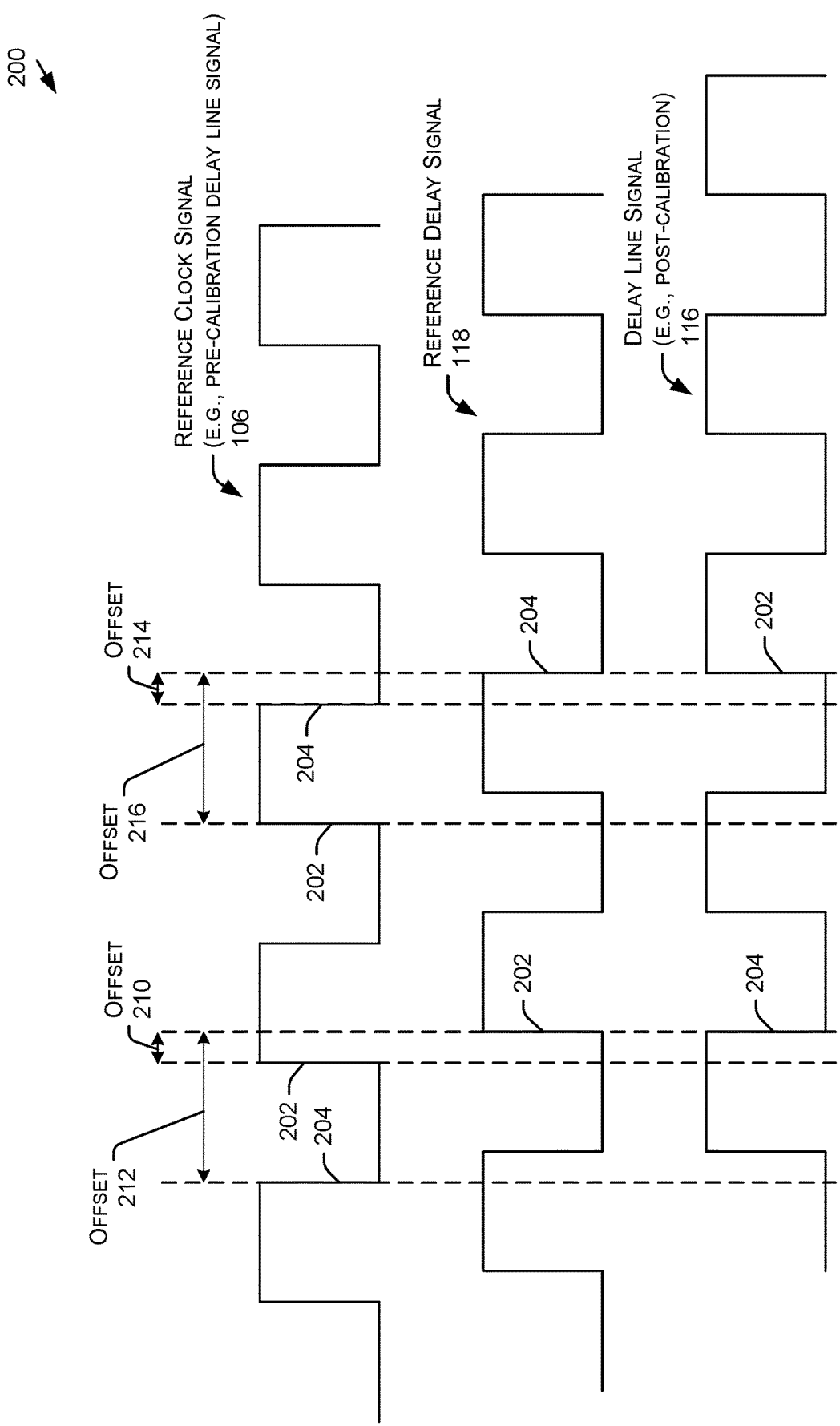
FIG. 2 is a timing diagram illustrating example detail associated with various clock signals described herein, in accordance with some embodiments of the present disclosure.

The process 100 illustrated in FIG. 1 may include a delay line 102 and a reference delay clock 104 that obtain and/or use a reference clock signal 106 (and/or a variation thereof) of a reference clock 108 from a phase selector 110. For instance, FIG. 2 is a timing diagram illustrating example detail 200 associated with various clock signals described herein, including the reference clock signal 106. The reference clock signal 106 described in FIG. 1 and illustrated in FIG. 2 may correspond to the first clock signal described above. The delay line 102 and the reference delay clock 104 may output a delay line signal 116 and a reference delay signal 118, respectively, which each may be delayed at least in part by respective path delays 120 and 122.

A calibrator 114 may obtain the delay line signal 116 and the reference delay signal 118 and output code 112 to calibrate the delay line 102. For instance, the offset determiner 124 of the calibrator 114 may determine one or more offsets between the delay line signal 116 and the reference delay signal 118, the adjuster 126 of the calibrator 114 may determine an amount to adjust the delay line signal 116 to reduce the offset(s), and the code generator 128 of the calibrator 114 may generate the code 112 based at least on the amount to adjust the delay line signal 116.

In some examples, the phase selector 110 may be used to selectively invert or refrain from inverting the reference clock signal 106, thereby allowing calibration for both phases of the reference clock signal 106. As such, the reference clock signal 106 obtained by the delay line 102, as well as the reference delay clock 104, may comprise an inverted version of the reference clock signal 106 and/or a non-inverted version of the reference clock signal 106. For instance, FIG. 3 is another timing diagram illustrating additional example detail 300 associated with the various clock signals described herein, including example detail associated with both inverted and non-inverted clock signals, such as the reference clock signal 106 and the reference delay signal 118 (non-inverted), as well as an inverted reference delay signal 302.

In some examples, the reference delay clock 104 may be configured to delay the reference clock signal 106. That is, and as illustrated in FIG. 2, the reference delay clock 104 may output a reference delay signal 118 that is delayed relative to the reference clock signal 106. By delaying the reference clock signal 106, the reference delay clock 104 may intentionally skew the reference delay signal 118 to a phase detector of a DDLL circuit. In this way, the DDLL circuit may be able to account for differences between respective path delays of the delay line 102 and the reference delay clock 104. For instance, even with careful layout, PVT variations and/or OCV may make it such that a path delay 120 associated with the delay line 102 may be different from a path delay 122 associated with the reference delay clock 104. Such differences in path delays may then lead to mismatches between the reference delay signal 118 and the delay line signal 116. In some instances, the delay line signal 116 and the reference delay signal 118 may correspond to the first clock signal and the second clock signal described above, respectively.

In some examples, the reference delay signal 118 may lag the reference clock signal 106 by a known magnitude. In some instances, the magnitude of the delay/lag may be in a range of 5% to 50% of the period of the reference clock signal 106. For example, if the period of the reference clock signal 106 is 100 milliseconds, a delay magnitude of 20% would mean a delay of 20 milliseconds. That is, a point on the reference delay signal 118 may lag the corresponding point on the reference clock signal 106 by 20 milliseconds.

In some examples, the delay line 102 may receive code 112 from a calibrator 114. The delay line 102 may use the code 112 to delay the reference clock signal 106 such that the delay line signal 116 is synchronized with the reference delay signal 118. For instance, the code 112 may indicate, to the delay line 102, an amount to adjust, shift, delay, etc. the reference clock signal 106 to synchronize it with the reference delay signal 118. In some examples, the code 112 may be indicative of a number of delay buffers for the delay line 102 to use to synchronize the delay line signal 116 with the reference delay signal 118.

For example, and with respect to FIG. 2, the delay line 102 may receive the code 112 from the calibrator 114 and use the code 112 to delay or otherwise shift the reference clock signal 106 such that the delay line signal 116 output from the delay line 102 is synchronized with the reference delay signal 118. For instance, the delay implemented by the delay line 102 may effectively delay/shift a rising edge 202 of the reference clock signal 106 such that the rising edge 202, with respect to the delay line signal 116, is synchronized with a falling edge 204 of the reference delay signal 118. Additionally, a falling edge 204 of the delay line signal 116, which may correspond to the falling edge 204 of the reference clock signal 106, may be synchronized with a rising edge 202 of the reference delay signal 118. In some examples, such as shown in FIG. 2, the amount of delay implemented by the delay line 102 may be less than a length of a period associated with the reference clock signal 106.

With reference again to FIG. 1, the calibrator 114 may receive the delay line signal 116 and the reference delay signal 118 as inputs, analyze various differences between the delay line signal 116 and the reference delay signal 118, and determine the code 112 as an output to maintain synchronization between the delay line signal 116 and the reference delay signal 118. The calibrator 114 may include an offset determiner 124, an adjuster 126, and a code generator 128.

In some examples, the offset determiner 124 of the calibrator 114 may determine one or more amounts of offset between one or more portions of the delay line signal 116 and one or more corresponding portions of the reference delay signal 118. For example, the offset determiner 124 may determine an amount of offset (e.g., delay, shift, displacement, time, etc.) between a portion (e.g., high phase, rising edge, falling edge, etc.) of the delay line signal 116 and a corresponding portion of the reference delay signal 118. Additionally, or alternatively, the offset determiner 124 may determine a second amount of offset between a second portion of the delay line signal 116 and a corresponding second portion of the reference delay signal 118. In some instances, the offset determiner 124 may determine the first amount of offset based on non-inverted versions of the delay line signal 116 and the reference delay signal 118, while determining the second amount of offset based on inverted versions of the delay line signal 116 and the reference delay signal 118.

For example, and with reference to FIG. 2, the offset determiner 124 may determine a first amount of offset 210 between the rising edge 202 of the reference clock signal 106 and the corresponding rising edge 202 of the reference delay signal 118, as well as a second amount of offset 212 between the falling edge 204 of the reference clock signal 106 and the rising edge 202 of the reference delay signal 118. Additionally, the offset determiner 124 may determine a third amount of offset 214 between the falling edge 204 of the reference clock signal 106 and the corresponding falling edge 204 of the reference delay signal 118, as well as a fourth amount of offset 216 between the rising edge 202 of the reference clock signal 106 and the falling edge 204 of the reference delay signal 118.

In some examples, and with reference now to FIG. 3, the offset determiner 124 may determine offsets associated with low phases of the reference signals based on the inverted versions of the signals, such as the inverted reference delay signal 302. For instance, the offset determiner 124 may determine an offset 214 between a falling edge 204 of the reference clock signal 106 and the rising edge 304 of the inverted reference delay signal 302, as well as an offset 216 between the rising edge 202 of the reference clock signal 106 and the rising edge 304 of the inverted reference delay signal 302. Additionally, the rising edge 304 of the inverted reference delay signal 302 may correspond to the falling edge 204 of the reference clock signal 106.

With reference again to FIG. 1, the adjuster 126 of the calibrator 114 may be configured to determine an amount to adjust the delay line signal 116 to reduce the amount of offset determined by the offset determiner 124. That is, the adjuster 126 may determine an amount that the delay line 102 needs to delay the reference clock signal 106 such that the delay line signal 116 is synchronized with the reference delay signal 118. In some examples, the adjuster 126 may determine the number of delay buffers to be used by the delay line 102 to delay the reference clock signal 106.

In some examples, the adjuster 126 may determine one or more values representing the different amount of offsets determined by the offset determiner. For instance, and with reference again to FIG. 2, the adjuster 126 may determine a first value associated with the first amount of offset 210, a second value associated with the second amount of offset 212, a third value associated with the third amount of offset 214, and a fourth value associated with the fourth amount of offset 216. In some examples, the adjuster 126 may further determine a first difference between the first value and the second value, a second difference between the third value and the fourth value, and then calculate an average value using the first difference and the second difference. This average value calculated by the adjuster 126 may represent the amount to adjust the reference clock signal 106 to reduce and/or minimize the different offsets 210-216.

With reference again to FIG. 1, the code generator 128 may generate the code 112 based at least on the amount to adjust the delay line signal 116 determined by the adjuster 126. For instance, the code generator 128 may obtain a value (e.g., the average value described above) from the adjuster 126 and, based at least on a magnitude of the value, generate the code 112. In some examples, the code 112 may indicate, to the delay line 102, the amount of delay to be implemented by the delay line 102 to synchronize the delay line signal 116 with the reference delay signal 118. In some examples, the code 112 may indicate a number of delay buffers for the delay line 102 to use to implement the delay.

In some examples, the delay line signal 116 may also be provided to one or more data pins, such as the data pin(s) 130. The data pin(s) 130 may, in some instances, be associated with a high-speed memory device/interface, such as a high-bandwidth memory (HBM) interface. Such an HBM interface, for example, may include thousands of the data pin(s) 130 with strict timing requirements, and the example process 100 for calibrating the delay line 102 based on a derived reference signal may be used to meet these strict timing requirements.

Figure 4:
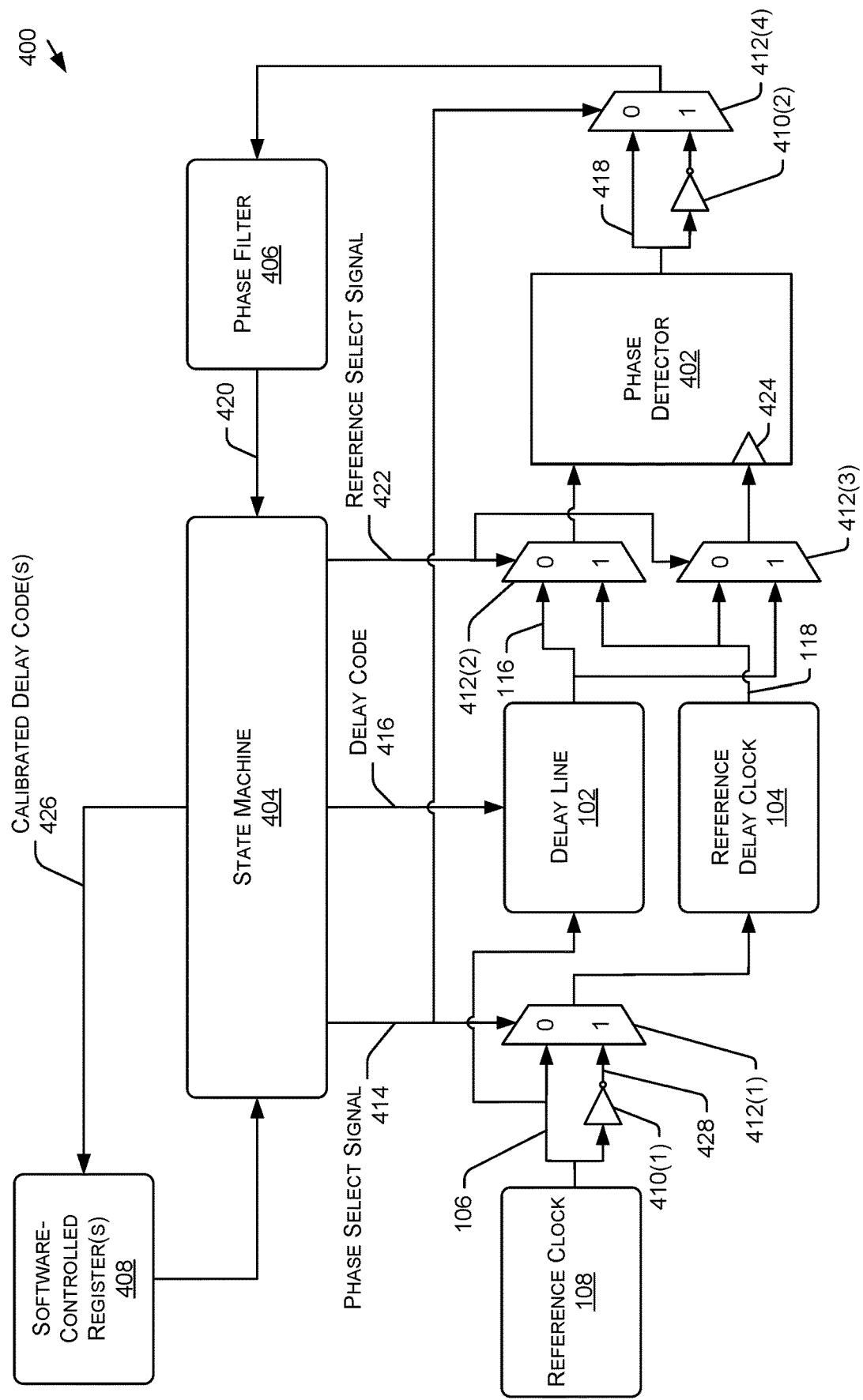
FIG. 4 is a system diagram illustrating an example of a circuit that may be used for calibrating a delay line based on a derived reference signal, in accordance with some embodiments of the present disclosure.

FIG. 4 is a system diagram illustrating an example circuit 400 that may be used for calibrating a delay line based on a derived reference signal, in accordance with some embodiments of the present disclosure. In some examples, the circuit 400 may correspond to a DDLL. Without limitation, the circuit 400 may include the delay line 102, the reference delay clock 104, the reference clock 108, a phase detector 402, a state machine 404, a phase filter 406, and one or more software-controlled registers, such as the software-controlled register(s) 408. Additionally, the circuit 400 may include various logic components and/or operators, including, but not limited to, inverters 410 and multiplexors 412.

In examples, one or more of the phase detector 402, the state machine 404, the phase filter 406, the software-controlled register(s) 408, the inverters 410, and/or the multiplexors 412 may correspond to one or more of the various components and/or elements illustrated in FIG. 1, such as the phase selector 110, the calibrator 114, the offset determiner 124, the adjuster 126, and/or the code generator 128.

In examples, the multiplexor 412(1) may select the reference clock signal 106 or the inverted reference clock signal 428 of the reference clock 108 based at least on a phase select signal 414. As shown in FIG. 4, the state machine 404 may transmit the phase select signal 414 to the multiplexor 412(1) with a logic level that is based on which phase of the reference clock 108 that the circuit 400 is currently measuring. For instance, if the circuit 400 is currently measuring the high phase of the reference clock 108, then the state machine 404 may transmit the phase select signal 414 with a logic level (e.g., 0) that selects the reference clock signal 106. If, on the other hand, the circuit 400 is currently measuring the low phase of the reference clock 108, then the state machine 404 may transmit the phase select signal 414 with a logic level (e.g., 1) that selects the inverted reference clock signal 428. The multiplexor 412(1) may then provide the selected version of the reference clock 108 to the reference delay clock 104.

The delay line 102 may be configured to delay the reference clock signal 106 received from the reference clock 108. The amount of delay through delay line 102 may be based on a delay code 416 transmitted by the state machine 404 to the delay line 102. In some examples, the delay code 416 may be a digital value that indicates a number of delay buffers to be used. For instance, each delay buffer may represent 1/N times the unit interval of the reference clock 108. Additionally, or alternatively, in some instances the delay code 416 may be a 6-bit digital value that varies from 0 to 63, where the delay code 416 indicates the number of buffers to be used by the delay line 102. As an example, a value of 1 in the delay code 416 may indicate one buffer of delay, a value of 2 in the delay code 416 may indicate 2 buffers of delay, a value of 3 in the delay code 416 may indicate 3 buffers of delay, and so forth. In examples, the delay line 102 may generate the delay line signal 116 that represents the version of the reference clock 108 as delayed by the number of buffers indicated by the delay code 416.

The reference delay clock 104 may be configured to generate the reference delay signal 118 that represents the version of the reference clock 108 selected by the multiplexor 412(1) as delayed by a known delay. In some examples, the amount of the known delay implemented by the reference delay clock 104 may intentionally skew the reference clock 108 to the phase detector 402 addresses any skew component(s) of calibration error. In some examples, the amount of delay implemented by the reference delay clock 104 may also be measured in terms of the delay code 416 and dynamically compensated by the state machine 404. For instance, although not depicted in FIG. 4, the state machine 404 may transmit a delay code 416 value to the reference delay clock 104 as well.

In some examples, the phase detector 402 of the circuit 400 may be implemented using a data (D) flip-flop or another logic component, including other types of flip-flops. The input (e.g., data input) of the phase detector 402 may be the output of the multiplexor 412(2), which selects either the delay line signal 116 of the delay line 102 or the reference delay signal 118 of the reference delay clock 104 based on a reference select signal 422 received from the state machine 404. A clock input 424 of the phase detector 402 may be the output of the multiplexor 412(3), which selects either the delay line signal 116 of the delay line 102 or the reference delay signal 118 of the reference delay clock 104 based on the reference select signal 422 received from the state machine 404. However, the configuration of the circuit 400 may ensure, as shown in FIG. 4, that when the input to the phase detector 402 is the delay line signal 116, the clock input 424 to the phase detector 402 is the reference delay signal 118, and vice-versa.

In some examples, the phase detector 402 may generate and output a phase detect signal 418 by sampling the input signal on a transition of the clock input 424. In some examples, the transition may be a rising edge or a falling of either one of the delay line signal 116 or the reference delay signal 118. That is, because of the configuration of the circuit 400, the phase detector 402 may be able to account for both rising edge and falling edge transitions. In function, the phase detector 402 may measure the phase of the delay line signal 116 versus the reference delay signal 118 to create the DDLL. During calibration, the state machine 404 may adjust the delay code 416 to sample the delay line signal 116 with various magnitudes of delay implemented through the delay line 102.

The phase filter 406 may, in some instances, obtain a version (e.g., inverted version or non-inverted version) of the phase detect signal 418 based on a selection made by the multiplexor 412(4) based on the phase select signal 414. For instance, the inverter 410(2) may invert the phase detect signal 418, and based on a logical value of the phase select signal 414, the multiplexor 412(4) may select either the original phase detect signal 418, or the inverted version thereof. In some examples, the phase filter 406 may generate a filtered phase detect signal 420 by applying a filter function to a set of samples of the phase detect signal 418, where the phase detect signal 418 may be a sample of the delay line signal 116. In examples, the function applied by the phase filter 406 may be an arithmetic average function, a weighted average function, a geometric average function, a statistical aggregation function, and/or other filtering functions on the samples of the phase detect signal 418. In some instances, the phase filter 406 may generate the filtered phase detect signal 420 in order to reduce the effects of spurious signals, noise, and/or the like in the phase detect signal 418. The phase filter 406 may then transmit the filtered phase detect signal 420 to the state machine 404.

In examples, the state machine 404 may control the components of circuit 400 through various iterations in order to calibrate the delay line 102. For instance, in a first iteration and in a second iteration, the state machine 404 may transmit the phase select signal 414 with a logic level that selects the reference clock signal 106 and the phase detect signal 418. In this first iteration, the state machine 404 may determine a first value ("C1") associated with calibrating an offset between a rising edge of the delay line signal 116 and a corresponding rising edge of the reference delay signal 118. In the second iteration, the state machine 404 may determine a second value ("C2") associated with calibrating an offset between a falling edge of the delay line signal 116 and the corresponding rising edge of the reference delay signal 118. The falling edge and the rising edge may define a low phase unit interval of the reference delay signal 118. Additionally, in a third iteration and in a fourth iteration, the state machine 404 may transmit the phase select signal 414 with a logic level that selects the inverted version of the phase detect signal 418. In this third iteration, the state machine 404 may determine a third value ("C3") associated with calibrating an offset between a falling edge of the delay line signal 116 and a corresponding rising edge of the (inverted) reference delay signal 118. In the fourth iteration, the state machine 404 may determine a fourth value ("C4") associated with calibrating an offset between the rising edge of the delay line signal 116 and the corresponding rising edge of the (inverted) reference delay signal 118. The rising edge and the falling edge may define a high phase unit interval of the reference delay signal 118.

During the various iterations, the state machine 404 may change the delay code 416 over a number of cycles of the reference clock 108 in order to select a different number of delay buffers for the delay line 102. For each different number of delay buffers, the state machine 404 may determine the values (e.g., C1, C2, C3, and/or C4) when the filtered phase detect signal 420 transitions from a low level to a high level. In some examples, the state machine 404 may determine one or more values indicating one or more amounts of offset between one or more portions of the delay line signal 116 and one or more corresponding portions of the reference delay signal 118. For instance, the state machine 404 may determine the values C1, C2, C3, and C4 described above, which may indicate amounts of offset between edges of the delay line signal 116 and corresponding edges of the reference delay signal 118. Additionally, in some examples, the state machine 404 may determine one or more amount of offset between phases of the delay line signal 116 and corresponding phases of the reference delay signal 118. For instance, the state machine 404 may determine a fifth value ("C5") indicating an amount of offset between a low phase of the delay line signal 116 and a corresponding low phase of the reference delay signal 118 by calculating a difference between the first value and the second value (e.g., C5=C2−C1). Additionally, the state machine 404 may determine a sixth value ("C6") indicating an amount of offset between a high phase of the delay line signal 116 and a corresponding high phase of the reference delay signal 118 by calculating a difference between the third value and the fourth value (e.g., C6=C4−C3).

In some examples, after the state machine 404 determines these values for the different phase offsets, the state machine 404 may determine a seventh value ("C7") that is indicative of an amount to adjust or delay the delay line signal 116 and/or the reference clock signal 106 to reduce the offset(s) described above. For instance, the state machine 404 may calculate the seventh value based at least on averaging or otherwise statistically aggregating the fifth value and the sixth value (e.g., C7=(C5+C6)/2). In some examples, the seventh value may be representative of, or related to, the number of buffers to be indicated by the delay code 416 to reduce and/or minimize the offsets. In some examples, the average may be determined by the state machine 404 based on a simple average, a weighted average, a geometric mean, and/or the like.

In some examples, the software-controlled register(s) 408 may be coupled to and/or communicate with the state machine 404. In examples, one or more processors may write data values to and/or read data values from the software-controlled register(s) 408 via a software interface. The software interface may be implemented via a communications bus. In examples, the processor(s) may include CPU, GPU, an accelerator, a microcontroller included in the CPU or an accelerator, and/or the like. In some examples, the software-controlled register(s) 408 may obtain and/or store one or more calibrated delay codes 426 from the state machine 404. The calibrated delay code(s) may, in some examples, indicate parameters for fine tuning the circuit 400 and/or the delay line 102 based on various changes in PVT and/or OCV.

In some examples, parameters may be stored (e.g., by one or more processors) in the software-controlled register(s) 408 via the software interface that control various aspects of the circuit 400. In one example, one or more parameters in the software-controlled register(s) 408 may control aspects of the phase filter 406. For instance, the parameter(s) may specify a number of samples of the phase detect signal 418 to be taken by the phase filter 406 and the filter function employed by the phase filter 406. In another example, the parameter(s) in the software-controlled register(s) 408 may control aspects of the state machine 404. For instance, the parameter(s) may specify whether the state machine 404 calibrates the high phase of the reference delay signal 118 first or whether state machine 404 calibrates the low phase of the reference delay signal 118 first. Additionally, or alternatively, the parameter(s) may specify which offset values to calibrate first (e.g., C1, C2, C3, or C4).

Now referring to FIGS. 5-7, each block of methods 500, 600, and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 500, 600, and 700 are described, by way of example, with respect to the system of FIG. 1 and/or FIG. 4. However, these methods may additionally or alternatively be executed by any one system, or any combination of systems, including, but not limited to, those described herein.

FIG. 5 is a flow diagram illustrating an example method 500 for calibrating a delay line based on a derived reference signal, in accordance with some embodiments of the present disclosure. The method 500, at block B502, includes determining a first value corresponding to a first amount of offset between one or more portions of a first clock signal and one or more corresponding portions of a second clock signal that is delayed relative to the first clock signal. For instance, the adjuster 126 of the calibrator 114 may determine the first value corresponding to the first amount of offset between the portion(s) of the first clock signal (e.g., the delay line signal 116) and the corresponding portion(s) of the second clock signal (e.g., the reference delay signal 118).

In some examples, the portion(s) of the first clock signal and the second clock signal may include a high phase(s) of the first clock signal, a low phase(s) of the first clock signal, a rising edge(s) of the first clock signal, a falling edge(s) of the first clock signal, and/or the like. In some examples, the first value may be determined based on one or more other values. For instance, the first value may be determined based on a third value and a fourth value. The third value may be associated with a third amount of offset between a rising edge of the first clock signal and a corresponding rising edge of the second clock signal. The fourth value may be associated with a fourth amount of offset between the rising edge of the first clock signal and a falling edge of the second clock signal that, together with the corresponding rising edge, defines a phase and/or unit interval of the second clock signal. In some examples, the first clock signal and the second clock signal may be inverted clock signals.

The method 500, at block B504, includes determining a second value based at least on the first value, the second value corresponding to a second amount to adjust the first clock signal to reduce the first amount of offset. For instance, the adjuster 126 may determine the second value based at least on the first value. That is, the adjuster 126 may determine the second amount to adjust the first clock signal to reduce the first amount of offset. In some examples, a magnitude of the second value may be indicative of a number of buffers to use to delay the first clock signal and reduce the first amount of offset.

The method 500, at block B506, includes causing a calibration of a delay line, based at least on the second value, to adjust the first clock signal. For instance, the calibrator 114 may send the code 112 to cause the calibration of the delay line 102 to adjust the first clock signal. In some examples, the code generator 128 may generate the code 112 based on output from the adjuster 126 and/or the offset determiner 124. In some examples, the code 112 may indicate, to the delay line 102, the number of buffers to use to synchronize the delay line signal 116 with the reference delay signal 118.

FIG. 6 is a flow diagram illustrating another example method 600 for calibrating a delay line based on a derived reference signal, in accordance with some embodiments of the present disclosure. The method 600, at block B602, includes determining a first value corresponding to a first amount of offset between a first phase of a first clock signal and the first phase of a second clock signal that is delayed relative to the first clock signal. For instance, the adjuster 126 may determine the first value based at least on the offset determiner 124 determining the first amount of offset between the first phase of the first clock signal (e.g., delay line signal 116) and the first phase of the second clock signal (e.g., reference delay signal 118). In some examples, the first phase of the first clock signal may correspond to the first phase of the second clock signal based at least on the second clock signal being delayed relative to the first clock signal. For instance, the second clock signal may be derived from the first clock signal by implementing a delay on the first clock signal. In some examples, the first phase may be a high phase of the clock signals.

The method 600, at block B604, includes determining, based at least on inverting at least one of the first clock signal or the second clock signal, a second value corresponding to a second amount of offset between a second phase of the first clock signal and the second phase of the second clock signal. For instance, the adjuster 126 may determine the second value based at least on the offset determiner 124 determining the second amount of offset between the second phase of the first clock signal and the second phase of the second clock signal. In some examples, the second phase may correspond to a low phase of the clock signals.

The method 600, at block B606, includes determining a third value based at least on the first value and the second value, the third value corresponding to a third amount to adjust the first clock signal to reduce the first amount of offset and the second amount of offset. For instance, the adjuster 126 may determine the third value based at least on the first value and the second value. That is, the adjuster 126 may determine the third amount to adjust the first clock signal to reduce the first amount of offset and/or the second amount of offset. In some examples, a magnitude of the third value may be indicative of a number of buffers to use to delay the first clock signal and reduce the first amount of offset and/or the second amount of offset.

The method 600, at block B608, includes causing a calibration of a delay line, based at least on the third value, to adjust the first clock signal. For instance, the calibrator 114 may send the code 112 to cause the calibration of the delay line 102 to adjust the first clock signal. In some examples, the code generator 128 may generate the code 112 based on output from the adjuster 126 and/or the offset determiner 124. In some examples, the code 112 may indicate, to the delay line 102, the number of buffers to use to synchronize the delay line signal 116 with the reference delay signal 118.

FIG. 7 is a flow diagram illustrating yet another example method 700 for calibrating a delay line based on a derived reference signal, in accordance with some embodiments of the present disclosure. The method 700, at block B702, includes determining a first value based at least on a first calibration between a delay line signal and a reference delay signal. For instance, the state machine 404 may perform the first calibration to calibrate the rising edge 202 of the reference delay signal 118 and the corresponding edge of the delay line signal 116. This first calibration may track a high to low transition on the phase detector 402. The first value may be determined by the state machine 404 based on the first calibration and stored locally.

The method 700, at block B704, includes determining a second value based at least on a second calibration between the delay line signal and the reference delay signal. For instance, the state machine 404 may perform the second calibration to calibrate the rising edge 202 of the delay line signal 116 and the falling edge 204 of reference delay signal 118. This second calibration may track a low to high transition on the phase detector 402. The second value may be determined by the state machine 404 based on the second calibration and stored locally.

The method 700, at block B706, includes determining a third value based at least on a third calibration between an inverted delay line signal and an inverted reference delay signal. For instance, the state machine 404 may perform the third calibration to calibrate the falling edge 204 of the reference delay signal 118 and the corresponding falling edge 204 of the delay line signal 116. However, because the delay line signal and the reference signal may be inverted during the third calibration, in function the state machine 404 may calibrate the rising edge 306 of the inverted reference clock signal 428 and the inverted reference delay signal 302. In some examples, the third calibration may track a high to low transition on the phase detector 402. The third value may be determined by the state machine 404 based on the third calibration and stored locally.

The method 700, at block B708, includes determining a fourth value based at least on a fourth calibration between the inverted delay line signal and the inverted reference delay signal. For instance, the state machine 404 may perform the fourth calibration to calibrate the falling edge 204 of the delay line signal 116 and the rising edge 202 of the reference delay signal 118. However, because the delay line signal and the reference signal may be inverted during the fourth calibration, in function the state machine 404 may calibrate the rising edge 306 of the inverted reference clock signal 428. In some examples, the fourth calibration may track a high to low transition on the phase detector 402. The fourth value may be determined by the state machine 404 based on the fourth calibration and stored locally.

The method 700, at block B710, includes determining a fifth value based at least on the first value and the second value. For instance, the state machine 404 may determine the fifth value by calculating a difference between the first value and the second value. In some examples, the fifth value may correspond to a unit interval delay code associated with the high phase of the delay line signal. That is, the fifth value may be indicative of a number of buffers for the delay line 102 to use to adjust the high phase of the delay line signal 116 to synchronize with the high phase of the reference delay signal 118.

The method 700, at block B712, includes determining a sixth value based at least on the third value and the fourth value. For instance, the state machine 404 may determine the sixth value by calculating a difference between the third value and the fourth value. In some examples, the sixth value may correspond to a unit interval delay code associated with the low phase of the delay line signal 116. That is, the sixth value may be indicative of a number of buffers for the delay line 102 to use to adjust the low phase of the delay line signal 116 to synchronize with the low phase of the reference delay signal 118.

The method 700, at block B714, includes determining a seventh value based at least on the fifth value and the sixth value. For instance, the state machine 404 may determine the seventh value by calculating an average of the fifth value and the sixth value. In some examples, the seventh value may correspond to a unit interval delay code associated with both phases of the delay line signal 116. That is, the seventh value may be indicative of a number of buffers for the delay line 102 to use to adjust both phases of the delay line signal 116 to synchronize with both phases of the reference delay signal 118.

The method 700, at block B716, includes calibrating a delay line based at least on the seventh value to synchronize the delay line signal with the reference delay signal. For instance, the state machine 404 may send the delay code 416 to the delay line 102, and the delay line 102 may use the delay code 416 to delay the reference clock signal 106 and generate the delay line signal 116.

Example Computing Device

Figure 8:
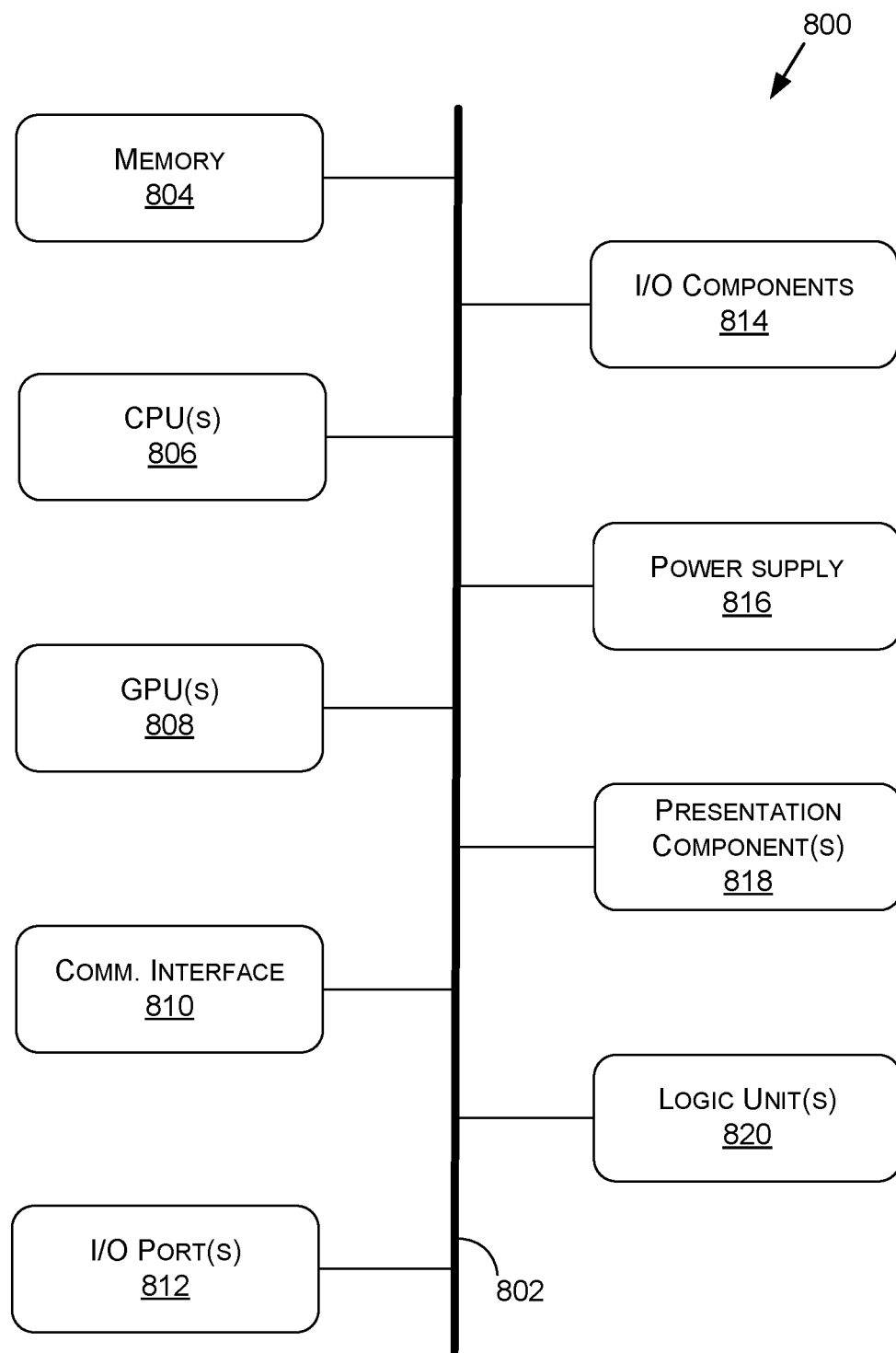
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
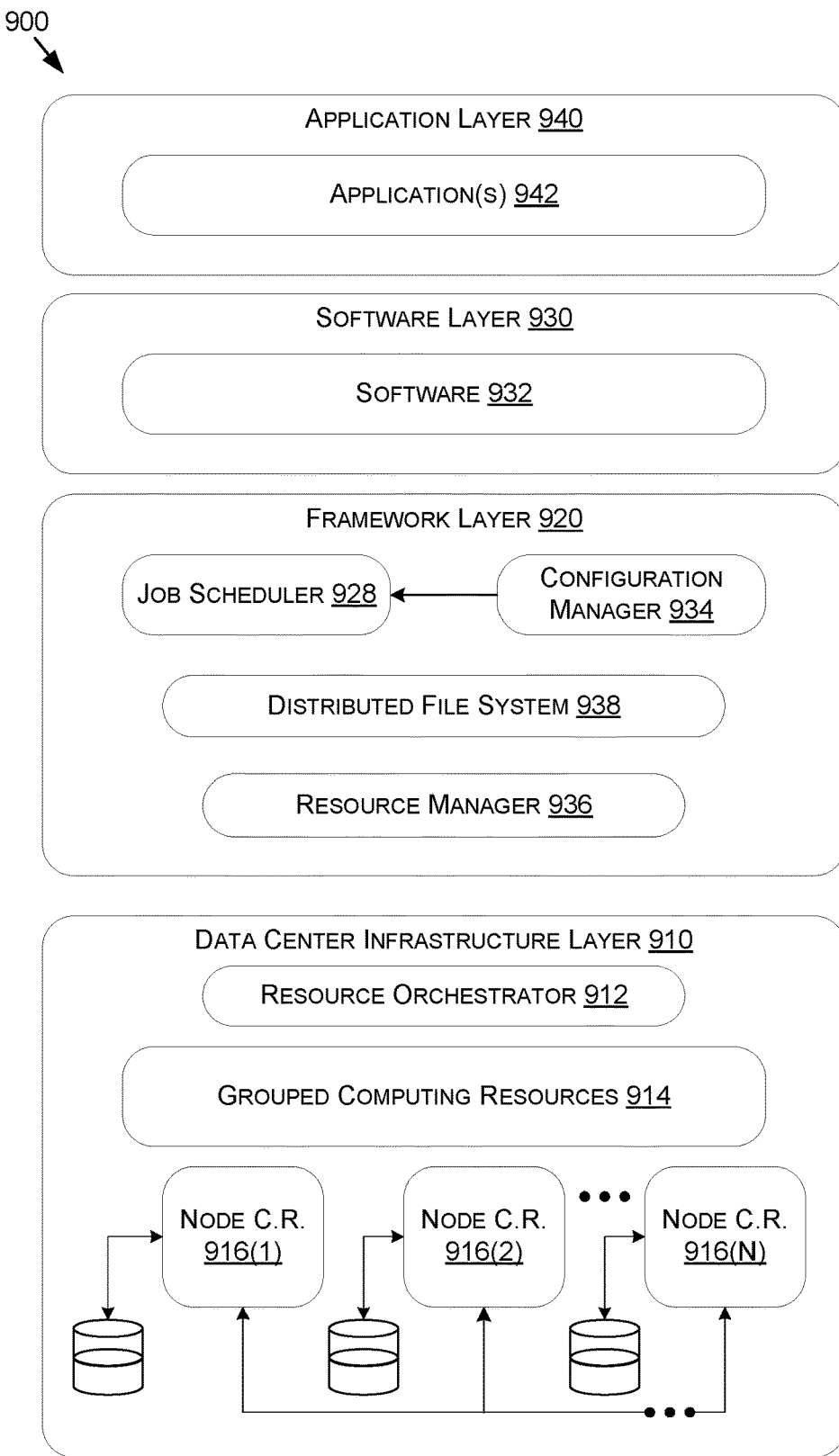
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may use distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underused and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining a first value corresponding to a first amount of offset between a first phase of a first clock signal and the first phase of a second clock signal that is delayed relative to the first clock signal;
   determining, based at least on inverting at least one of the first clock signal or the second clock signal, a second value corresponding to a second amount of offset between a second phase of the first clock signal and the second phase of the second clock signal;
   determining a third value based at least on the first value and the second value, the third value corresponding to a third amount to adjust the first clock signal to reduce the first amount of offset and the second amount of offset; and
   causing a calibration of a delay line, based at least on the third value, to adjust the first clock signal.

2. The method of claim 1, wherein the determining the third value includes averaging at least the first value and the second value, the third value indicative of a number of buffers to be used by the delay line to adjust the first clock signal to reduce the first amount of offset and the second amount of offset.

3. The method of claim 1, wherein the determining the first value comprises determining a fourth value corresponding to a fourth amount of offset between a first rising edge of the first clock signal and a second rising edge of the second clock signal, the second rising edge corresponding to the first rising edge based at least on the second clock signal being delayed relative to the first clock signal.

4. The method of claim 3, wherein the determining the first value further comprises determining a fifth value corresponding to a fifth amount of offset between the first rising edge of the first clock signal and a falling edge of the second clock signal, the falling edge and the second rising edge defining a unit interval of the second clock signal.

5. The method of claim 1, wherein the determining the second value comprises:
   determining a fourth value corresponding to a fourth amount of offset between a first rising edge of the first clock signal and a second rising edge of the second clock signal, the second rising edge corresponding to the first rising edge based at least on the second clock signal being delayed relative to the first clock signal; and
   determining a fifth value corresponding to a fifth amount of offset between the first rising edge and a falling edge of the second clock signal, the falling edge and the second rising edge defining a unit interval of the second clock signal.

6. The method of claim 1, wherein:
   the first value corresponds to a first unit interval associated with at least one of the first clock signal or the second clock signal, and
   the second value corresponds to a second unit interval associated with the at least one of the first clock signal or the second clock signal.

7. The method of claim 1, wherein the second clock signal is delayed, relative to the first clock signal, using a known delay that has a magnitude within a range of 10 percent to 50 percent of a period associated with the first clock signal.

8. The method of claim 1, wherein the causing the calibration of the delay line comprises indicating a number of buffers to be used by the delay line to adjust the first clock signal.

9. The method of claim 1, further comprising causing, based at least on a change in at least one of a process, a voltage, or a temperature, a second calibration of the delay line based at least on a fourth value corresponding to a fourth amount to adjust the first clock signal.

10. A system comprising:
    one or more processors to:
    determine a first value corresponding to a first amount of offset between one or more first portions of a first clock signal and one or more second portions of a second clock signal that is delayed relative to the first clock signal, the one or more first portions corresponding to the one or more second portions;
    determine a second value based at least on the first value, the second value corresponding to a second amount to adjust the first clock signal to reduce the first amount of offset; and
    cause a calibration of a delay line, based at least on the second value, to adjust the first clock signal.

11. The system of claim 10, the one or more processors further to determine a third value corresponding to a third amount of offset between one or more third portions of the first clock signal and one or more fourth portions of the second clock signal, the one or more third portions corresponding to the one or more fourth portions, wherein the determination of the second value is based at least on the first value and the third value.

12. The system of claim 11, wherein the determination of the third value is based at least on inverting at least one of the first clock signal or the second clock signal.

13. The system of claim 10, wherein the one or more first portions correspond to the one or more second portions based at least on the second clock signal being delayed relative to the first clock signal.

14. The system of claim 10, wherein:
    the one or more first portions of the first clock signal correspond to at least one of one or more rising edges of the first clock signal, one or more falling edges of the first clock signal, one or more high phases of the first clock signal, or one or more low phases of the first clock signal, and
    the one or more second portions of the second clock signal correspond to at least one of one or more rising edges of the second clock signal, one or more falling edges of the second clock signal, one or more high phases of the second clock signal, or one or more low phases of the second clock signal.

15. The system of claim 10, the one or more processors further to cause a second calibration of the delay line based at least on a third value corresponding to a third amount to adjust the first clock signal.

16. The system of claim 10, wherein the second clock signal is delayed, relative to the first clock signal, using a known delay that has a magnitude within a range of 10 percent to 50 percent such that a first point associated with the first clock signal leads a second point of the second clock signal by the magnitude, the second point corresponding to the first point.

17. The system of claim 10, wherein the system is comprised in at least one of:
    a control system for an autonomous or semi-autonomous machine;
    a perception system for an autonomous or semi-autonomous machine;
    a system for performing one or more simulation operations;

a system for performing one or more digital twin operations;
a system for performing light transport simulation;
a system for performing collaborative content creation for 3D assets;
a system for performing one or more deep learning operations;
a system implemented using an edge device;
a system implemented using a robot;
a system for performing one or more generative AI operations;
a system for performing operations using a large language model;
a system for performing one or more conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

18. At least one processor comprising:
one or more circuits to calibrate a delay line using a first value corresponding to a first amount by which the delay line is to delay a first clock signal to reduce a second amount of offset between one or more first portions of the first clock signal and one or more second portions of a second clock signal, the second clock signal being a delayed version of the first clock signal, wherein the first amount by which the delay line is to delay the first clock signal is to further reduce a third amount of offset between one or more third portions of the first clock signal and one or more fourth portions of the second clock signal, the one or more third portions and the one or more fourth portions corresponding to one or more inverted portions of the first clock signal and the second clock signal.

19. The at least one processor of claim 18, wherein the processor is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system implemented using a robot;
a system for performing one or more generative AI operations;
a system for performing operations using a large language model;
a system for performing one or more conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

20. The at least one processor of claim 18, wherein the second clock signal is delayed, with respect to the first clock signal, using a known delay that has a magnitude within a range of 10 percent to 50 percent such that a first point associated with the first clock signal leads a second point of the second clock signal by the magnitude, the second point corresponding to the first point.

* * * * *